United States Patent Office 3,113,686
Patented Dec. 10, 1963

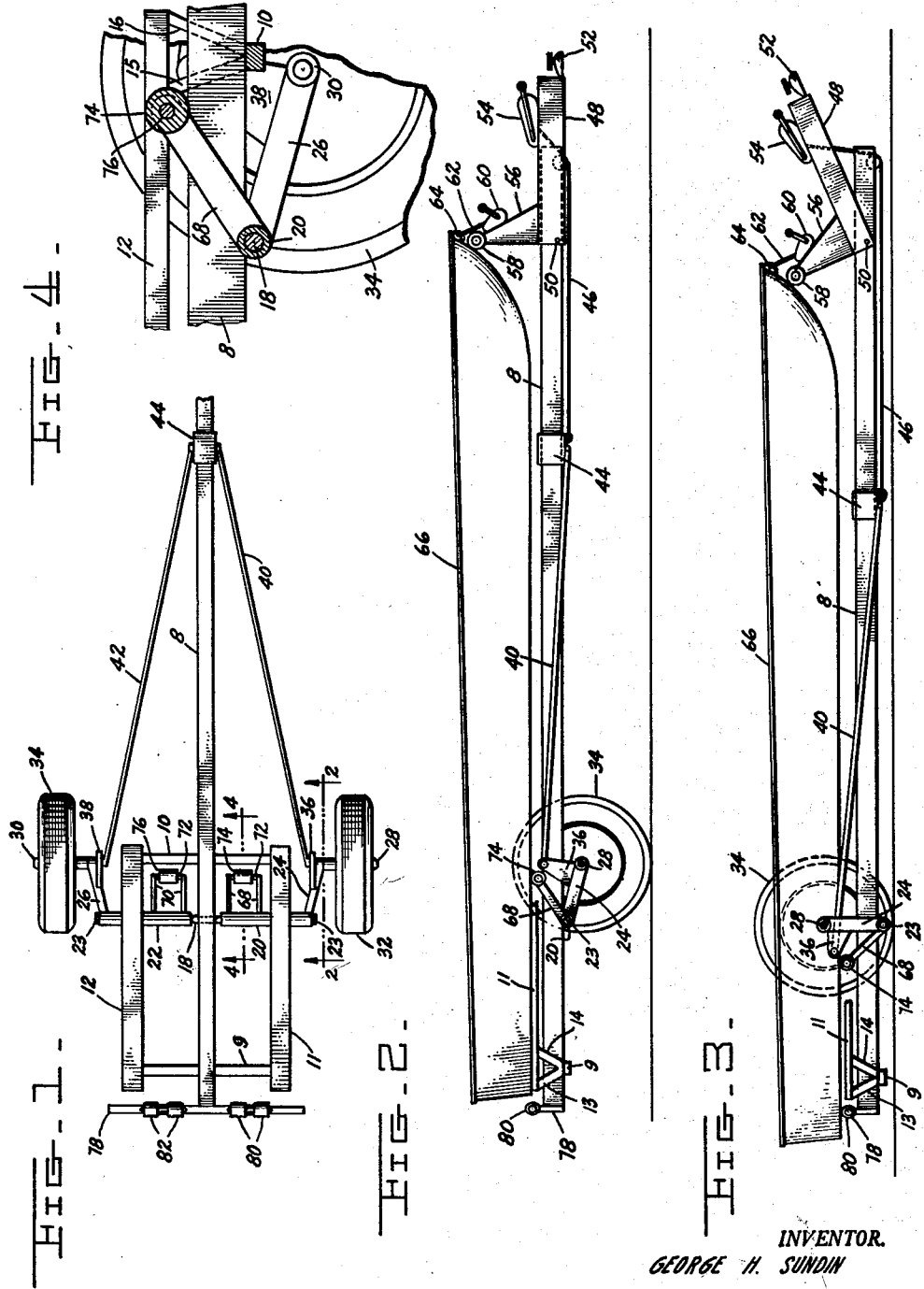

3,113,686
BOAT TRAILER
George H. Sundin, Duluth, Minn., assignor to
Clifford K. Brown, Duluth, Minn.
Filed Dec. 19, 1960, Ser. No. 76,912
15 Claims. (Cl. 214—84)

This invention relates generally to boat trailers, and pertains more particularly to a trailer of the drop frame type.

One object of the present invention is to provide a boat trailer having a frame that can be raised and lowered very quickly and with a minimum of effort. More specifically, the invention has for an aim the raising and lowering of the frame in a substantially parallel relationship with the ground so that there is for all intents and purposes no tilting of the boat or other object being carried by the trailer during the period that the frame is being elevated or dropped. In other words, the attitude of the boat does not change during this interval.

Another object of the invention is to provide a boat trailer in which the boat is urged somewhat rearwardly as the drop frame is lowered, thereby facilitating the removal of the boat from the trailer. In this regard, the invention contemplates the use of a pivotal bow stop that pushes the boat aft sufficiently so that its stern then rests on a rearwardly disposed set of rollers.

A further object is to provide a boat trailer in which a cushioning action is inherent in the trailer construction while being towed, thereby obviating the need for coil springs and the like.

Yet another object of the invention is to provide a trailer that is exceedingly light in weight and which can be fabricated at a relatively low cost, whereby its widespread use is encouraged.

Other objects will be in part obvious and in part pointed out more in detail hereinafter.

The invention accordingly consists in the features of construction, combination of elements and arrangement of parts which will be exemplified in the construction hereafter set forth and the scope of the application which will be indicated in the appended claims.

In the drawing:

FIGURE 1 is a plan view of the trailer with the right-hand or forwardmost portion thereof removed, this view showing the trailer frame raised but without a boat thereon;

FIGURE 2 is largely a side elevational view corresponding to FIGURE 1 but having a boat shown supported on the trailer, the view being taken generally in the direction of line 2—2 of FIGURE 1;

FIGURE 3 is a view generally similar to FIGURE 2 but with the frame in a lowered or dropped position, and FIGURE 4 is a considerably enlarged fragmentary sectional view taken in the direction of line 4—4 of FIGURE 1.

Referring now in detail to the drawing, the boat trailer there selected for the purpose of exemplifying the instant invention comprises a central tongue 8 having a pair of cross members 9, 10 fixed thereto as by welding. The cross members 9, 10 support a pair of side rests 11, 12 by means of V-shaped struts 13, 14 at one end and 15, 16 at the other end. While in the pictured arrangemnet, the cross members 9 and 10 underlie the tongue 8, it will be appreciated that where a boat having a relatively large or deep keel is to be carried the members 9 and 10 can extend over the top of the tongue 8 rather than under same. For the purpose of understanding the invention, it should be noted that the tongue 8, the cross members 9 and 10, plus the side rests 11 and 12 together with the struts 13—16 constitute what will be termed a "frame." Quite clearly, this frame is susceptible to rather wide modifications, but the structure that has been depicted will serve very well to illustrate the structure that is to be raised and lowered in accordance with the teachings of the invention. For instance, the members 9 and 10 may be bowed or curved to the extent that the V-shaped struts would not be employed.

For a purpose presently to be made clear, a transverse rod 18 is secured to the underside of the tongue 8, this rod extending laterally to either side of the tongue. In order to orient the reader in a better fashion, a pair of sleeves has been given separate reference numerals 20 and 22, respectively. These sleeves are free to rotate on the rod 18, although they are prevented from becoming detached by a suitable nut or other element 23.

The sleeve 20 has an arm 24 fixedly carried thereon; and the sleeve 22 has an identical arm 26 affixed to it. The arms 24 are in this way compelled to rotate in unison with their respective sleeves. The free end of the arms 24, 26 support a pair of stub axles 28, 30, respectively. These axles 28 and 30 in turn rotatably journal a pair of wheels 32, 34. It will be discerned from FIGURE 1 that the arms 24, 26 diverge outwardly with respect to each other from their associated sleeves. As the description progresses, it will be recognized that this incorporates into the trailer construction an inherent resiliency that obviates the need for springs or the like, this being by reason of the fact that the arms 24 and 26 themselves act as appropriate cushioning or resilient means. Further resiliency, when desired, can be obtained by the aforementioned bowing of the members 9 and 10.

The arms 24 and 26 are also provided with crank elements labeled 36, 38, respectively. Attached to the crank elements 36 and 38 are forwardly extending rods 40, 42, these rods converging toward a central location which is in the form of a slidable member 44 which freely encompasses the tongue 8. The movement of the slide 44 in a forward direction is achieved through the agency of a cable 46.

Attention is called at this time to the employment of a pivotal drawbar in the form of an inverted channel member 48. Pivotal action of the drawbar 48 is derived through the medium of a transverse pin 50 passing through the tongue 8. At the forward end of the drawbar 48 is disposed a conventional socket 52 which is normally attached to a complemental ball carried at the rear of a towing vehicle. Mounted on the drawbar 48 is a winch to which the forward end of the cable 46 is connected. The winch is of customary construction and need not be described in detail other than to say that it is for the purpose of imparting tension to the cable 46 as it is operated. Also mounted on the drawbar 48 is an upstanding bow stop 56 having a roller member 58 at its upper end. The stop in this instance supports a winch 60 having attached thereto a cable 62 leading to a suitable eye 64 on a boat 66 that is to be transported on the trailer, the winch being useful in pulling the boat onto the rests 11, 12.

Returning now to the sleeves 20 and 22, it is to be noted that these sleeves have fixedly attached thereto a first pair of arms 68 and a second pair of such arms 70. Between each pair of arms 68, 70 is a shaft 72. One shaft carries a roller 74 and the other shaft a roller 76. Although the rollers 74, 76 are identical, it will assist the reader in orienting himself, particularly with respect to FIGURE 4, to employ these different numerals. The rollers 74, 76 are normally inactive, but support a portion of the boat 66 during the lowering of the side rests 11 and 12 so that the frame is actually moved away from the bottom of the boat during the lowermost travel of the frame toward its dropped position. This will be made manifest during the operational sequence that will be subsequently described. Also cooperating in the easy demounting of the boat 66 is a transverse support 78 carried at the rear end of the tongue 8. It will be perceived that this support 78 carries two pairs of rollers denoted by the reference numeral 80 and 82.

Having presented the foregoing detailed information, a brief description of the way in which my boat trailer is operated will be of help in appreciating the various benefits to be derived from its construction. Considering FIGURE 3, it is to be noted that the frame comprised of the members 8—16 is there shown in its lowered or dropped position. This position serves as a convenient place to start the description. While the towing vehicle does not appear in the drawing, it will be appreciated that the socket 52 is constrained against any reciprocal movement, it being only free to pivot into the position it appears in FIGURE 3. When the winch 54 is actuated in a direction to tighten the cable 46, the slide 44 moves forwardly or to the right, pulling with it the rods 40 and 42 which are attached to the crank elements 36, 38.

This action, as viewed in FIGURE 3, causes the axles 28, 30 to be pulled forwardly, carrying with them their respective wheels 32, 34. This is so because the operation of the winch 54 forces the drawbar 48 into a straightline relationship with the tongue 8, this being the condition of the drawbar 48 and tongue 8 in FIGURE 2. It is important to note that the tongue 8 is compelled to rise due to the action of the crank elements 36, 38. In this regard, it is only the wheels 32 and 34 that are free to be moved forwardly, and they move in this direction in shifting from the position in which they are pictured in FIGURE 3 to that in which they appear in FIGURE 2. In other words, the arms 24, 26 move in a clockwise direction as the winch 54 is operated to tighten the cable 46. As they so move, they lift or elevate the tongue 8 via the sleeves 20, 22 and the transverse rod 18. It will be recalled that the transverse rod 18 is secured fast to the underside of the tongue 8. Owing to the angular relationship between the arms 24, 26 and the arms 68, 70, the side rests 11, 12 are elevated more than the rollers 74, 76 so that by the time the frame reaches the position depicted in FIGURE 2 the side rests 11 and 12 of the frame will be the members actually supporting the boat 66. In other words, the load is transferred from the rollers 74, 76 to the side rests 11, 12.

The role played by the rollers 74, 76 and their supporting arms 68, 70 perhaps will be better understood from a brief description of how the frame is lowered or dropped. Consequently, when the winch 54 is operated in a direction to pay out the cable 46 the weight of the boat 66, together with the various frame members 8—16, will cause the arms 24, 26 to rotate in a counter-clockwise direction as viewed in FIGURE 2. As they move in this particular direction, the rollers 74, 76 are compelled to traverse an arcuate path which is at a rate different from that through which the side rests 11, 12 are moved. This causes the load of the boat 66 to be ultimately shouldered by these particular rollers during the lowering or dropping of the frame, more specifically, near the end of the frame's downward travel.

It is of interest to observe that with the winch 60 actuated so as to pull the boat 66 against the upright stop 56, more particularly its roller 58, the lowering of the boat 66 from the position in which it appears in FIGURE 2 to that shown in FIGURE 3 causes the bow stop 56 to urge the boat rearwardly so that its stern then rests on the rollers 80, 82. In this way, the boat 66 is in a condition for ready removal from the trailer. All that the individual needs to do is to pull the boat 66 rearwardly on the rollers 80, 82 and the rollers 74, 76. This is easily done once the boat has reached its lowermost position, which is the position illustrated in FIGURE 3.

It should be stressed that when the boat 66 is in its elevated position for transport, this being the position depicted in FIGURE 2, that the arms 24, 26, together with the rods 40, 42 impart a considerable amount of resiliency to the overall construction so that normally used springs are not needed. In this regard, it will be appreciated that the rods 40, 42 will readily flex to permit the arms 24, 26 to assume changes in attitude during travel. If desired, a slight bowing can be incorporated into each rod to enhance their flexibility.

Not only does this feature contribute to keeping the trailer light in weight but it reduces the cost of its manufacture. Consequently, it is believed readily apparent that this particular trailer construction possesses a number of advantages over prior art trailers.

Although believed obvious, a latch or transverse pin arrangement co-acting with the tongue 8 might be utilized to assure retention of the drawbar 48 in the straightline position of FIGURE 2 during travel, thereby relieving the cable 46 of such a task. Resort to such means will obviate the chance of the cable 46, if rather thin, breaking during the transportation of relatively heavy boats over rough roads.

As many changes could be made in the above construction and many apparently widely different embodiments of the invention could be made without departing from the scope thereof, it is intended that all matter contained in the above description or shown in the accompanying drawing shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

What is claimed is:

1. A boat trailer of the drop frame type comprising a frame, a pair of wheels located at the sides of said frame and near the rear end thereof, a pair of arms pivotally connected at one end to said frame and pivotally connected to said wheels at their other end, a drawbar having its forward end adapted to be attached to a vehicle and its rear end pivotally connected to said frame to permit thereby the forward end of said frame to be lowered when said drawbar is caused to assume an acute angle with said frame, operating means mounted on said drawbar, motion transmitting means extending forwardly from said arms to said operating means, and roller means carried by said arms so as to be movable therewith but relative to said frame so as to support a portion of the weight of said boat after said frame has been lowered to a predetermined extent, whereby when said operating means is actuated in one direction with the forward end of said drawbar constrained against rectilinear movement said arms will cause said wheels to move forwardly and said frame to move upwardly until said drawbar has assumed a substantially straight line relationship with said frame.

2. A boat trailer in accordance with claim 1 in which said operating means includes a winch and said motion transmitting means includes a flexible cable actuated by said winch.

3. A boat trailer in accordance with claim 1 including an upstanding bow stop mounted on said drawbar near the rear end thereof, said bow stop having a roller at its upper end so as to urge a boat carried on said frame rearwardly when said frame is lowered from a raised position and said drawbar is shifting from a straight line position with respect to said frame to an acute relationship therewith.

4. A boat trailer in accordance with claim 3 including upstanding roller means adjacent the rear end of said frame for supporting the stern of the boat when said boat is moved rearwardly by said bow stop during the lowering of said frame and sufficiently high to prevent the boat from sliding rearwardly when said frame is raised.

5. A boat trailer of the drop frame type comprising a central tongue, cross members fixedly secured to said tongue and extending laterally therefrom, longitudinal side rests secured to the ends of said cross members for supporting a boat thereon, bearing means carried by said tongue, and disposed laterally to either side of said tongue to locations beyond said side rests, a pair of arms pivotally connected at one end to said bearing means and diverging away from each other so that the other ends of said arms are spaced farther apart than their one ends, said diverging arms imparting resilient support to said tongue by reason of their divergence, a stub axle secured to each of said other ends, a wheel rotatably mounted on each axle, a crank element secured to each arm intermediate its ends, and means attached to the free ends of said crank elements for swinging said arms about said axles.

6. A boat trailer in accordance with claim 5 in which said bearing means includes a transverse rod secured intermediate its ends to said tongue, and a pair of sleeves rotatably carried on said rod, said one end of said arms being fixedly secured to said sleeves to provide said pivotal connection to said bearing means.

7. A boat trailer in accordance with claim 6 including a slide member carried on said tongue, a pair of rearwardly diverging rods connected at their forward ends to said slide member and their rear ends connected to said crank elements, and means for actuating said slide member along said tongue.

8. A boat trailer in accordance with claim 7 including a drawbar, a transverse pin pivotally connecting said drawbar to a point near the forward end of said tongue, and said actuating means including a winch mounted on said drawbar and a cable extending from said drawbar to said slide member.

9. A boat trailer in accordance with claim 6 including roller means, and additional arms having one end fixedly secured to said sleeves so as to be pivotal therewith and free ends carrying said roller means, said additional arms extending at an acute angle with respect to said pair of arms so as to support a portion of said boat as said frame approaches its lowermost position.

10. A boat trailer in accordance with claim 9 including a drawbar, a transverse pin pivotally connecting said drawbar to a point near the forward end of said tongue, said actuating means including a winch mounted on said drawbar and a cable extending from said drawbar to said slide member, and an upstanding bow stop mounted on said drawbar near the rear end thereof, said bow stop having a roller at its upper end so as to urge said boat rearwardly on said roller means when said winch is operated in a direction to pay out said cable.

11. A boat trailer in accordance with claim 10 including additional roller means mounted at the rear of said tongue, whereby the movement of said bow stop will urge the boat onto said additional roller means.

12. A boat trailer of the drop frame type comprising a frame, a pair of wheels located at the sides of said frame and near the rear end thereof, a pair of arms pivotally connected at one end to said frame and pivotally connected to said wheels at their other end, a drawbar having its forward end adapted to be attached to a vehicle and its rear end pivotally connected to said frame to permit thereby the forward end of said frame to be lowered when said drawbar is caused to assume an acute angle with said frame, operating means mounted on said drawbar including a winch, motion transmitting means extending forwardly from said arms to said winch including a flexible cable actuated by said winch, an upstanding bow stop mounted on said drawbar near the rear end thereof, said bow stop having a roller at its upper end so as to urge a boat carried on said frame rearwardly when said frame is lowered from a raised position and said drawbar is shifting from a straight line position with respect to said frame to an acute relationship therewith, roller means adjacent the rear end of said frame for supporting the stern of the boat when said boat is moved rearwardly by said bow stop, and roller means carried by said arms so as to be movable therewith but relative to said frame so as to support a portion of the weight of said boat after said frame has been lowered beneath the upper surface of said first-mentioned roller means, whereby when said winch is actuated in one direction with the forward end of said drawbar constrained against rectilinear movement said arms will cause said wheels to move forwardly and said frame to move upwardly until said drawbar has assumed a substantially straight line relationship with said frame.

13. A boat trailer of the drop frame type comprising a frame, a pair of wheels located at the sides of said frame and rear the rear end thereof, a pair of arms, first respective means pivotally connecting one end of each arm to said frame, second respective means pivotally connecting the other end of each arm to said wheels including a transverse rod secured intermediate its ends to said frame and a pair of sleeves rotatably carried on said rod, one of said arms being secured to one of said sleeves and the other of said arms being secured to the other of said sleeves, a crank element integral with each arm and extending generally perpendicularly therefrom at a locus nearer said other end than said one end, a drawbar having its forward end adapted to be attached to a vehicle and its rear end pivotally connected to said frame to permit thereby the forward end of said frame to be lowered when said drawbar is caused to assume an acute angle with said frame, winch means mounted on said drawbar, motion transmitting means connected at one end to said crank elements, said transmitting means including a flexible cable at the other end which is connected to said winch means, additional arm means on each of said sleeves arranged at an angle with respect to said pair of arms, and roller means carried by each of said arm means for supporting a portion of a boat as said frame approaches its lowermost position, whereby when said operating means is actuated in one direction with the forward end of said drawbar constrained against rectilinear movement said arms will cause said wheels to move forwardly and said frame to move upwardly until said drawbar has assumed a substantially straight line relationship with said frame.

14. A boat trailer in accordance with claim 13 including upstanding means disposed on said drawbar rearwardly of said winch means having a roller at its upper end for engaging the bow of said boat to urge said boat rearwardly as the roller means on said additional arm means engages and raises said boat.

15. A boat trailer of the drop frame type comprising a frame, a pair of wheels located at the sides of said frame and near the rear end thereof, a pair of arms pivotally connected at one end to said frame and pivotally connected to said wheels at their other end, a drawbar having its forward end adapted to be attached to a vehicle and its rear end pivotally connected to said frame to permit thereby the forward end of said frame to be lowered when said drawbar is caused to assume an acute angle with said frame, operating means mounted on said drawbar, motion transmitting means extending forwardly from said arms to said operating means, and means movable by said arm at a different rate from the rate at which said frame is moved for ultimately shouldering a portion of the weight of said boat during the lowering of said frame, whereby when said operating means is actuated in one direction with the forward end of said drawbar constrained against rectilinear movement said arms will cause said wheels to move forwardly and said frame to move upwardly until said drawbar has assumed a substantially straight line relationship with said frame.

References Cited in the file of this patent

UNITED STATES PATENTS

| | | |
|---|---|---|
| 2,788,908 | Lynd | Apr. 16, 1957 |
| 2,793,774 | Lovegreen | May 28, 1957 |
| 2,937,775 | Funk | May 24, 1960 |
| 2,953,266 | Anderson | Sept. 20, 1960 |
| 3,012,682 | Williamson | Dec. 12, 1961 |